US011625836B2

(12) United States Patent
Hayashi et al.

(10) Patent No.: US 11,625,836 B2
(45) Date of Patent: Apr. 11, 2023

(54) TRAJECTORY CALCULATION DEVICE, TRAJECTORY CALCULATING METHOD, AND TRAJECTORY CALCULATING PROGRAM

(71) Applicant: Qoncept, Inc., Tokyo (JP)

(72) Inventors: Kenichi Hayashi, Tokyo (JP); Shunsuke Nambu, Tokyo (JP)

(73) Assignee: QONCEPT, INC., Tokyo (JP)

( * ) Notice: Subject to any disclaimer, the term of this patent is extended or adjusted under 35 U.S.C. 154(b) by 261 days.

(21) Appl. No.: 17/082,758

(22) Filed: Oct. 28, 2020

(65) Prior Publication Data

US 2021/0133983 A1 May 6, 2021

(30) Foreign Application Priority Data

Oct. 30, 2019 (JP) .............................. JP2019-197199

(51) Int. Cl.
*G06T 7/246* (2017.01)
*G06T 7/73* (2017.01)
*G06T 7/00* (2017.01)

(52) U.S. Cl.
CPC ................ *G06T 7/246* (2017.01); *G06T 7/73* (2017.01); *G06T 7/97* (2017.01); *G06T 2207/30224* (2013.01); *G06T 2207/30241* (2013.01)

(58) Field of Classification Search
CPC .. G06T 7/246; G06T 7/73; G06T 7/97; G06T 2207/30224; G06T 2207/30241; G06T 2207/10021; G06T 7/292; G06T 7/55; G06T 7/66; G06T 2207/10016; G06T 7/20; G06T 7/70; H04N 5/247; H04N 13/239

USPC .......................................................... 382/103
See application file for complete search history.

(56) References Cited

U.S. PATENT DOCUMENTS

| 9,886,624 B1* | 2/2018 | Marty ..................... G06V 20/42 |
| 2008/0219509 A1* | 9/2008 | White ................ A63B 24/0021 382/107 |
| 2014/0267775 A1* | 9/2014 | Lablans .................. G06T 7/246 348/169 |

(Continued)

FOREIGN PATENT DOCUMENTS

| JP | H1166319 | 3/1999 |
| JP | 2001-273500 | 10/2001 |

(Continued)

*Primary Examiner* — Ming Y Hon
(74) *Attorney, Agent, or Firm* — Trojan Law Offices

(57) ABSTRACT

In the case where a three-dimensional position of a moving body is calculated based on image data taken by a plurality of cameras that are synchronized, high performance equipment and system such as a system to make the synchronization among the plurality of cameras and a camera having a built-in function to make the synchronization are required. It is also required to fix the camera position with high accuracy beforehand. It is made possible to calculate a trajectory of a moving body as a target in the three-dimensional space using image data taken by a plurality of cameras that are non-synchronized mutually, thereby solving the above issue. And positions of respective cameras are calculated in the three-dimensional space from a plurality of reference points having fixed position coordinates in the three-dimensional space that are commonly shown in the image data of the respective cameras, thereby solving the above issue.

11 Claims, 6 Drawing Sheets

(56) References Cited

U.S. PATENT DOCUMENTS

| | | | |
|---|---|---|---|
| 2017/0150118 A1* | 5/2017 | Pacheco | H04N 13/243 |
| 2017/0213087 A1* | 7/2017 | Chen | G06V 20/42 |
| 2017/0333777 A1* | 11/2017 | Spivak | G06T 7/246 |
| 2018/0018529 A1* | 1/2018 | Hiramatsu | G06T 7/215 |
| 2018/0051982 A1* | 2/2018 | Yin | G06T 7/596 |
| 2018/0316907 A1* | 11/2018 | Azuma | H04N 13/243 |
| 2018/0339386 A1* | 11/2018 | Lee | B23Q 17/22 |
| 2019/0147219 A1* | 5/2019 | Thornbrue | G06T 7/254 |
| | | | 348/169 |
| 2019/0191098 A1* | 6/2019 | Ishii | H04N 23/61 |
| 2020/0279503 A1* | 9/2020 | Smith | A63B 71/0622 |
| 2021/0209799 A1* | 7/2021 | Sugawara | H04N 13/246 |
| 2021/0268659 A1* | 9/2021 | Olmstead | G06V 10/751 |
| 2021/0319228 A1* | 10/2021 | Fleischman | G06F 16/7837 |
| 2022/0044423 A1* | 2/2022 | Tsizin-Goldman | G06V 20/42 |

FOREIGN PATENT DOCUMENTS

| | | |
|---|---|---|
| JP | 2005-235104 | 9/2005 |
| JP | 2007-115236 | 5/2007 |
| JP | 2019-121019 | 7/2019 |

\* cited by examiner

TRAJECTORY CALCULATION DEVICE, TRAJECTORY CALCULATING METHOD, AND TRAJECTORY CALCULATING PROGRAM

CROSS REFERENCE TO RELATED APPLICATIONS

This application is based upon and claims the benefits of priorities from Japanese Patent Application No. 2019-197199 filed on Oct. 30, 2019, the entire contents of which are incorporated herein by reference.

FIELD OF THE INVENTION

The present invention relates to a trajectory calculation device, a trajectory calculation method, and a trajectory calculation program.

RELATED ART

As a device for calculating a position of a moving body in the three-dimensional space using two dimensional image data taken by a plurality of cameras, a device in which the position of the moving body is calculated in the three-dimensional space based on image (hereinafter, referred to as "stereo image") data taken by a plurality of cameras that are in synchronization with each other is known. For example, there is provided a device such as those described in JP H11(1999)-66319, A and JP 2005-235104, A and so on.

And the trajectory of the moving body can also be calculated by obtaining consecutive three-dimensional positions of the moving body from the stereo image data. For example, JP 2005-235104, A and so on may be referred to.

SUMMARY OF THE INVENTION

However, with respect to the device described in JP H11(1999)-66319, A or JP 2005-235104, A, it is necessary for a plurality of cameras to take videos in synchronization with each other. Therefore, in order to realize such a calculation, high performance equipment and system such as a system to make the synchronization among the plurality of cameras and a camera having a built-in function to make the synchronization are required. Further, the position arrangement of the cameras is restricted since it is necessary two cameras should be connected with cables and the like in order to make the synchronization.

And, in order to calculate the position of the moving body in the three-dimensional space based on the image data, it is required to fix the camera position with high accuracy beforehand since the position information of the cameras having taken the video in the three-dimensional space is necessary. It is preferable to utilize images (videos) of the cameras (for example, fixed cameras installed in the studio facilities) having their measured installation positions in a fixed manner with the facilities to be used for taking images, but in an event such as a sports event, facilities and outdoor space where cameras are not installed in a fixed manner are often utilized. In such a case, it is required that cameras are installed while the costs for measurement of camera position and camera installation work are kept lower such that it is an issue that the position of the moving body in the three-dimensional space can be calculated only from the image (video) data taken by the cameras while the arrangement freedom of cameras is still kept high.

In an embodiment of the present invention, it is made possible to calculate a trajectory of a moving body as a target in the three-dimensional space using image (video) data taken by a plurality of cameras that are non-synchronized mutually, thereby solving the above issue. Therefore, there is no need for the high performance equipment or system such as a camera having a built-in function to make synchronization and a system synchronizing a plurality of cameras.

Also, in an embodiment of the present invention, positions of respective cameras are calculated in the three-dimensional space from a plurality of reference points having fixed position coordinates in the three-dimensional space that are commonly shown in the image (video) data of the respective cameras, thereby solving the above issue. Therefore, it is possible to increase the freedom of position arrangement of cameras while the costs for measurement of camera positions and camera installation work.

A trajectory calculation device in an embodiment of the present invention is a trajectory calculation device for calculating a trajectory of a target moving body, image data of which are taken by two cameras selected from a plurality of cameras that are mutually non-synchronized and installed in different positions, using image data thereof being characterized by comprising:

a two-dimensional position calculation unit capable of detecting the target moving body from image data in an image frame taken by each camera and calculating a two-dimensional position of the target moving body in the image frame;

an existence plane calculation unit capable of calculating a three-dimensional plane constituted by connecting three-dimensional positions of the target moving body in consecutive image frames taken by a first camera and an optical center point of a lens of the first camera as an existence plane from a two-dimensional position of the target moving body taken by the first camera and calculated by the two-dimensional position calculation unit and position coordinates and posture (orientation) of the first camera in the three-dimensional space; and a three-dimensional trajectory calculation unit capable of calculating a trajectory of the target moving body in the three-dimensional space from an intersection point of a straight line connecting an optical center point of a lens of a second camera and a three-dimensional position of the target moving body in an image frame taken by a second camera, which intersects an existence plane calculated by the existence plane calculation unit at the intersection point, and from a two-dimensional position of the target moving body taken by the second camera and calculated by the two-dimensional position calculation unit and position coordinates and posture (orientation) of the second camera in the three-dimensional space.

Here, in the present specification, the posture (orientation) of the camera is referred to as a combination of parameters representing condition of the camera necessary for the trajectory calculation in the three-dimensional space of the target moving body. Details thereof will be explained in embodiments to be described later. In the present specification, it may be a combination of parameters representing condition of the camera necessary for the trajectory calculation of the target moving body in the three-dimensional space.

And the trajectory calculation device in an embodiment of the present invention is characterized by comprising: a camera information calculation unit capable of calculating position coordinates and orientation of the cameras taking the image data in the three-dimensional space from a plurality of reference points having fixed coordinates in the three-dimensional space and existing in image data of an image frame.

Further, the trajectory calculation device in an embodiment of the present invention is characterized in that the camera information calculation unit selects two cameras, respective optical axes of which are closest to vertical, from the plurality of cameras installed in different positions as the first camera and the second camera. The trajectory calculation device in an embodiment of the present invention is characterized in that the camera information calculation unit selects a camera, an optical axis of which is closest to vertical to a moving direction of the target moving body, as the second camera. Thus, a camera to conduct the trajectory calculation with high accuracy can be selected from a plurality of cameras installed in different positions.

Also, a trajectory calculation method in an embodiment of the present invention is a method of calculating a trajectory of a target moving body, image data of which are taken by two cameras selected from a plurality of cameras that are mutually non-synchronized and installed in different positions, using image data thereof and the method is characterized by comprising:

a two-dimensional position calculation step of detecting the target moving body from image data in an image frame taken by each camera and calculating a two-dimensional position of the target moving body in the image frame;

an existence plane calculation step of calculating a three-dimensional plane constituted by connecting three-dimensional positions of the target moving body in consecutive image frames taken by a first camera and an optical center point of a lens of the first camera as an existence plane from a two-dimensional position of the target moving body taken by the first camera and calculated in the two-dimensional position calculation step and position coordinates and orientation of the first camera in the three-dimensional space; and a three-dimensional trajectory calculation step of calculating a trajectory of the target moving body in the three-dimensional space from an intersection point of a straight line connecting an optical center point of a lens of a second camera and a three-dimensional position of the target moving body in an image frame taken by a second camera, which intersects an existence plane calculated in the existence plane calculation step at the intersection point, and from a two-dimensional position of the target moving body taken by the second camera and calculated in the two-dimensional position calculation step and position coordinates and orientation of the second camera in the three-dimensional space.

And, the trajectory calculation method in an embodiment of the present invention is characterized by comprising: a camera information calculation step of calculating position coordinates and orientation of the cameras taking the image data in the three-dimensional space from a plurality of reference points having fixed coordinates in the three-dimensional space and existing in image data of an image frame.

A trajectory calculation program in an embodiment of the present invention is a trajectory calculation program causing a computer to work to calculate a trajectory of a target moving body, image data of which are taken by two cameras selected from a plurality of cameras that are mutually non-synchronized and installed in different positions, using image data thereof, and the program is characterized by causing the computer to execute:

a two-dimensional position calculation step of detecting the target moving body from image data in an image frame taken by each camera and calculating a two-dimensional position of the target moving body in the image frame;

an existence plane calculation step of calculating a three-dimensional plane constituted by connecting three-dimensional positions of the target moving body in consecutive image frames taken by a first camera and an optical center point of a lens of the first camera as an existence plane from a two-dimensional position of the target moving body taken by the first camera and calculated in the two-dimensional position calculation step and position coordinates and orientation of the first camera in the three-dimensional space; and a three-dimensional trajectory calculation step of calculating a trajectory of the target moving body in the three-dimensional space from an intersection point of a straight line connecting an optical center point of a lens of a second camera and a three-dimensional position of the target moving body in an image frame taken by a second camera, which intersects an existence plane calculated in the existence plane calculation step at the intersection point, and from a two-dimensional position of the target moving body taken by the second camera and calculated in the two-dimensional position calculation step and position coordinates and orientation of the second camera in the three-dimensional space.

And in the trajectory calculation program according to an embodiment of the present invention, the program is characterized by causing the computer to execute:

a camera information calculation step of calculating position coordinates and orientation of the cameras taking the image data in the three-dimensional space from a plurality of reference points having fixed coordinates in the three-dimensional space and existing in image data of an image frame.

As mentioned above, according to an embodiment of the present invention, the above-mentioned issue can be solved and a trajectory of a target moving body, image data of which are taken by two cameras selected from a plurality of cameras that are mutually non-synchronized and installed in different positions, can be calculated using image data thereof.

EMBODIMENT OF CARRYING OUT THE INVENTION

An embodiment of the present invention will be explained with reference to the drawings. Here, duplicated explanations will be omitted and the same symbols are assigned to the same or corresponding parts in every drawing.

A trajectory calculation device of an embodiment calculates a trajectory of a target moving body in the three-dimensional space, wherein image data of the target moving body is taken by two cameras that are selected from a plurality of cameras, wherein the two cameras are not synchronized with each other and are installed in different positions, and wherein the image data is used for the calculation. Here, the image data is accompanied by time when it is taken as information in an embodiment of the present invention.

A trajectory calculation device of an embodiment is what to be employed suitably as a device calculating a trajectory of a moving body that moves in a predetermined field in accordance with the law of motion such as a ball in a ball game such as baseball, ping-pong, volleyball, etc. These are examples and the application is not limited to the athletic sports.

Figure 1:
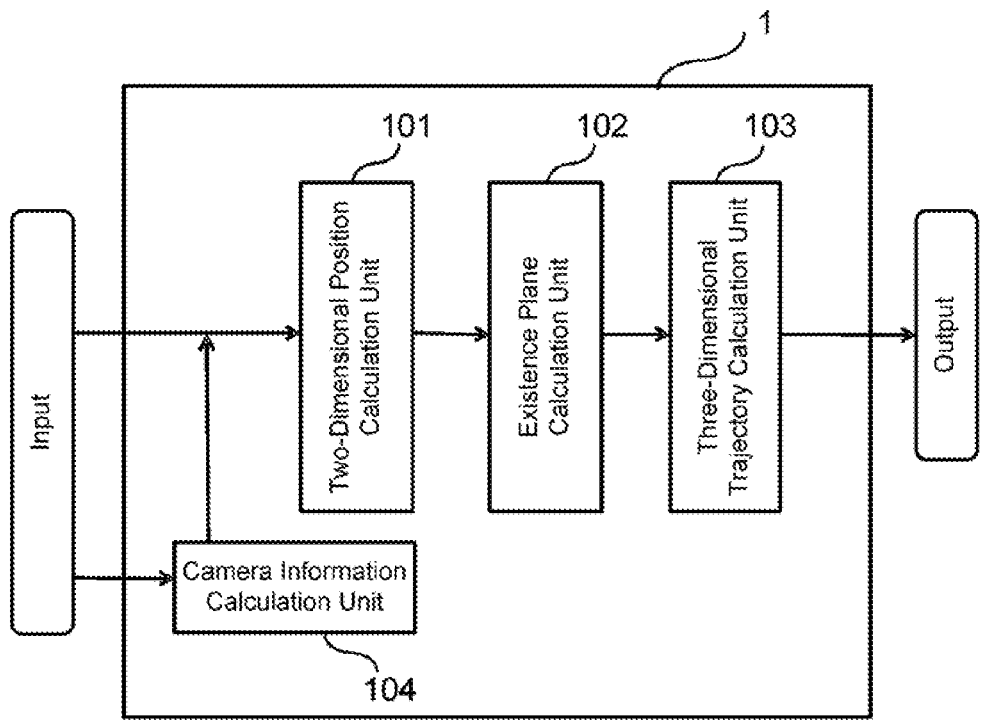
FIG. 1 shows a block diagram of a trajectory calculation device.
Figure 2:
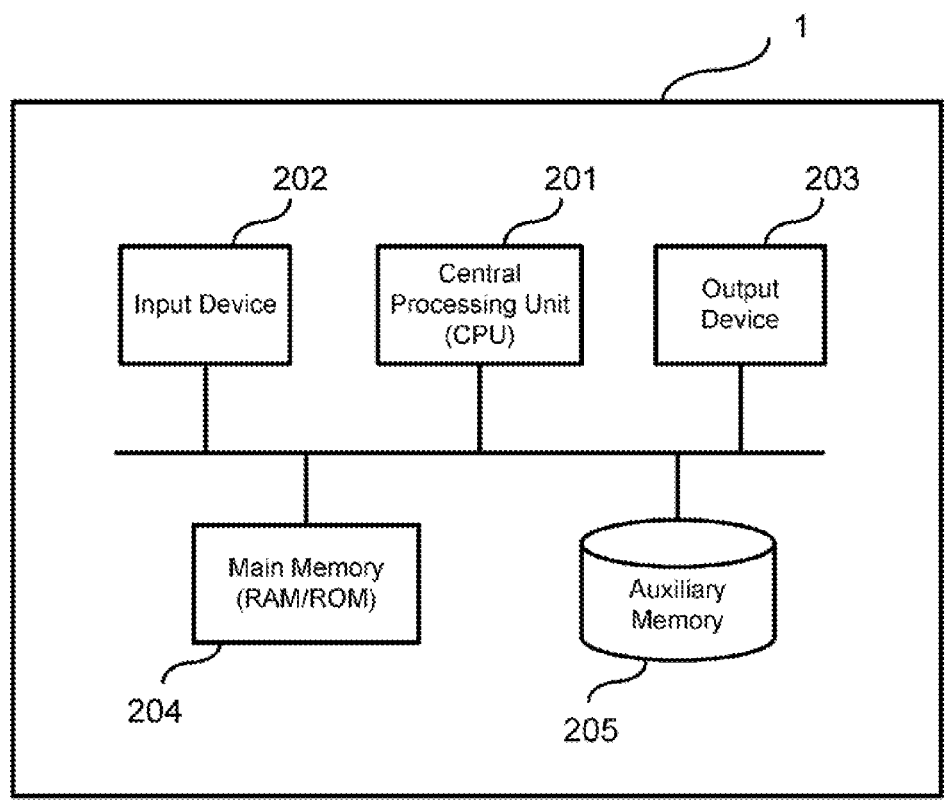
FIG. 2 shows a hardware configuration diagram of the trajectory calculation device.

FIG. 1 shows a block diagram of a trajectory calculation device 1. The trajectory calculation device 1 may be used not only in an embodiment where it is configured as a stand-alone device, but also in an embodiment where it is configured to be incorporated into another device such as a moving body tracking device utilizing image data. The other device that incorporates the trajectory calculation device 1 may be an electric appliance such as a smartphone, an information mobile terminal, a digital camera, a game terminal, a television, etc. A moving body detecting device 1 is configured to be a computer including physically a central processing unit (CPU) 201, an input device 202, an output device 203, a main memory (RAM/ROM) 204, and an auxiliary memory 205 as shown in FIG. 2.

Each function of the trajectory calculation device 1 is realized by making the input device 202 and the output device 203 operate under the control of the central processing unit (CPU) 201 and the main memory (RAM/ROM) 204 and the auxiliary memory 205 read and write data by making the central processing unit (CPU) 201, the main memory (RAM/ROM) 204, and so on read a program to cause the computer to work to calculate a trajectory of a target moving body from images in an image frame.

As shown in FIG. 1, the trajectory calculation device 1 includes a two-dimensional position calculation unit 101, an existence plane calculation unit 102, a three-dimensional trajectory calculation unit 103, and a camera information calculation unit 104. A plurality of images or videos (moving images) are taken by a plurality of cameras that are non-synchronized mutually and installed in different positions and respective consecutive image frames of respective cameras therefrom are given to the trajectory calculation unit 1 together with time when they are taken from the outside as the input. And the trajectory calculation device 1 outputs a trajectory of a target moving body in the three-dimensional space as the output to the outside. Here, the output information may be information that can specify the trajectory of the target moving body in the three-dimensional space. For example, coordinates of the target moving body in the three-dimensional space at a plurality of different times and information of a three-dimensional curve as a function of time in the three-dimensional space approximated from these coordinates are considered.

Here, the consecutive image frames signify a state where no image frame exist between two image frames, but it is not necessary for the number of each frame to be consecutive. For example, even if two image frames are consecutive, the number of each frame may not be consecutive since another image frame originally having existed between the two image frames is removed by a frame removal process. And the consecutive two image frames may not have to be in the order of the time, but the former image frame may be an image frame taken after the latter image frame. Thus, in the case where the moving body tracking is conducted along the flow of time, the image frame taken earlier is the former image frame of the consecutive image frames and in the case where the moving body tracking is conducted as it goes back in time, the image frame taken later is the former image frame of the consecutive image frames.

And since the consecutive image frames are from each camera, the consecutive image frames exist independently for each camera of a plurality of cameras that are non-synchronized with each other and installed in different positions.

According to the block diagram of FIG. 1, a function of each block of the trajectory calculation device 1 is explained. Here, a detailed operation of each block will be explained in an embodiment to be described later.

A two-dimensional position calculation unit 101 detects a target moving body from input image data in an image frame and calculates a two-dimensional position of the target moving body in the image frame. The two-dimensional position of the target moving body in the image frame is defined by predetermined two-dimensional coordinates.

An existence plane calculation unit 102 calculates a three-dimensional plane constituted by connecting three-dimensional positions of the target moving body in consecutive image frames taken by a first camera and an optical center point of a lens of the first camera as an existence plane from a two-dimensional position of the target moving body taken by the first camera and calculated by the two-dimensional position calculation unit 101 and position coordinates and orientation of the first camera in the three-dimensional space.

Here, the position coordinates and orientation of the camera in the three-dimensional space may signify those of the camera position expressed by coordinates of the three-dimensional system and those of the camera orientation (or direction) expressed by coordinates of the three-dimensional system, respectively. And the position of the optical center point of the lens of the camera corresponds to that of the camera and may also be expressed by coordinates of the three-dimensional system. And, the optical center point of the lens may correspond to the principal point. In the case of the thin lens approximation, the principal point may correspond to the center point of the lens. And the plane perpendicular to the optical axis and passing through the principal point may be called as the principal plane.

A three-dimensional trajectory calculation unit 103 calculates a trajectory of the target moving body in the three-dimensional space from an intersection point at which a line connecting a three-dimensional position of the target moving body in an image frame taken by a second camera and an optical center point of a lens of the second camera intersects an existence plane calculated by the existence plane calculation unit 102 from a two-dimensional position of the target moving body taken by the second camera and calculated by the two-dimensional position calculation unit 101 and position coordinates and orientation of the second camera in the three-dimensional space.

A camera information calculation unit 104 calculates position coordinates and orientation of the camera taking the image data in the three-dimensional space from a plurality of reference points having fixed coordinates in the three-dimensional space existing in the image data in the image frame. The camera information calculation unit 104 operates in the case where position coordinates and orientation of the camera in the three-dimensional space are not given. In such a case, the operation of the camera information calculation unit 104 will be described later as in Embodiment 2.

And the camera information calculation unit 104 selects a camera to calculate a trajectory with higher accuracy from a plurality of cameras installed in different positions based on the calculated information. Two cameras, as a first camera and a second camera, are selected, optical axes of which are closet to vertical, from a plurality of cameras installed in different positions, respectively. And a camera, an optical axis of which is closest to vertical to a moving direction of the target moving body, is selected as the second camera.

Next, an operation of the trajectory calculation device 1 in the present embodiment is explained. In consideration of easiness of understanding, the operation of the trajectory calculation device 1 is explained, for example, with reference to a ball thrown by a pitcher in baseball as the target moving body. Here, it is just an example, and the application of the present invention is not limited to athletic sports such as baseball.

Embodiment 1

In Embodiment 1, the operation of the trajectory calculation device 1 is explained in the case where the first camera and the second camera are selected from a plurality of cameras that are non-synchronized with each other and installed in different positions and position coordinates and orientation of the first camera and the second camera are given in the three-dimensional space in the three-dimensional coordinate system.

Figure 3:
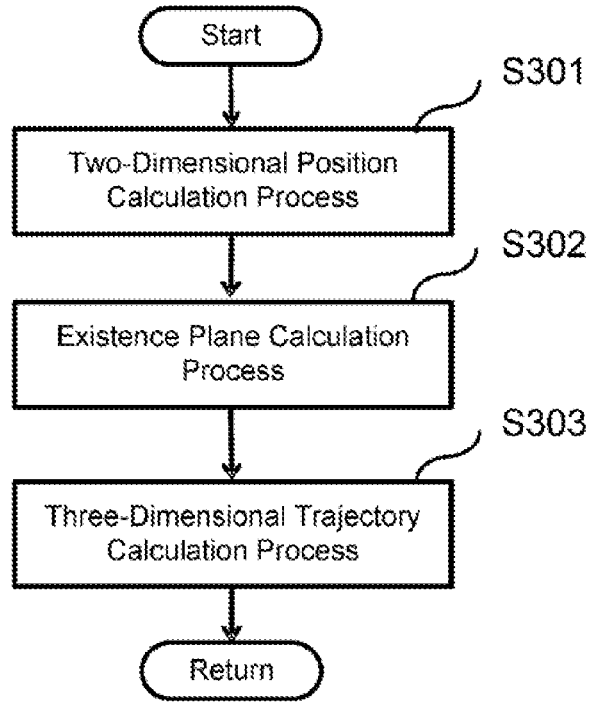
FIG. 3 shows a flow chart showing operations of the trajectory calculation device of Embodiment 1.

FIG. 3 shows a flow chart illustrating an operation of the trajectory calculation device 1 of Embodiment 1. The operation of the trajectory calculation device 1 is explained in accordance with the flow chart of FIG. 3.

The trajectory calculation device 1 starts the operation by inputting from the outside information about position coordinates and orientation of the first camera and the second camera in the three-dimensional space and image data in image frames of the first camera and the second camera. The initiation of the operation may be made by an explicit instruction or automatically after inputting.

Once the trajectory calculation device 1 starts the operation, the two-dimensional position calculation unit 101 executes a two-dimensional position calculation process (S301). In the two-dimensional position calculation process (S301), the target moving body is detected from the image data in the image frames of the first camera and the second camera and two-dimensional positions are calculated in the image frames. Here, in the following, an example of the operation of the trajectory calculation device 1 of Embodiment 1 is described, but another operation thereof may be made as long as the target moving body can be detected such that the operation is not limited to the following description.

In the two-dimensional position calculation process (S301), the moving body judged to be the best match is detected as the target by calculating a degree of match with weighting by position as an image of the target moving body (hereinafter referred to as a template image) is compared with candidate images of the target moving body included in the image data in the input image frames.

Figure 4:
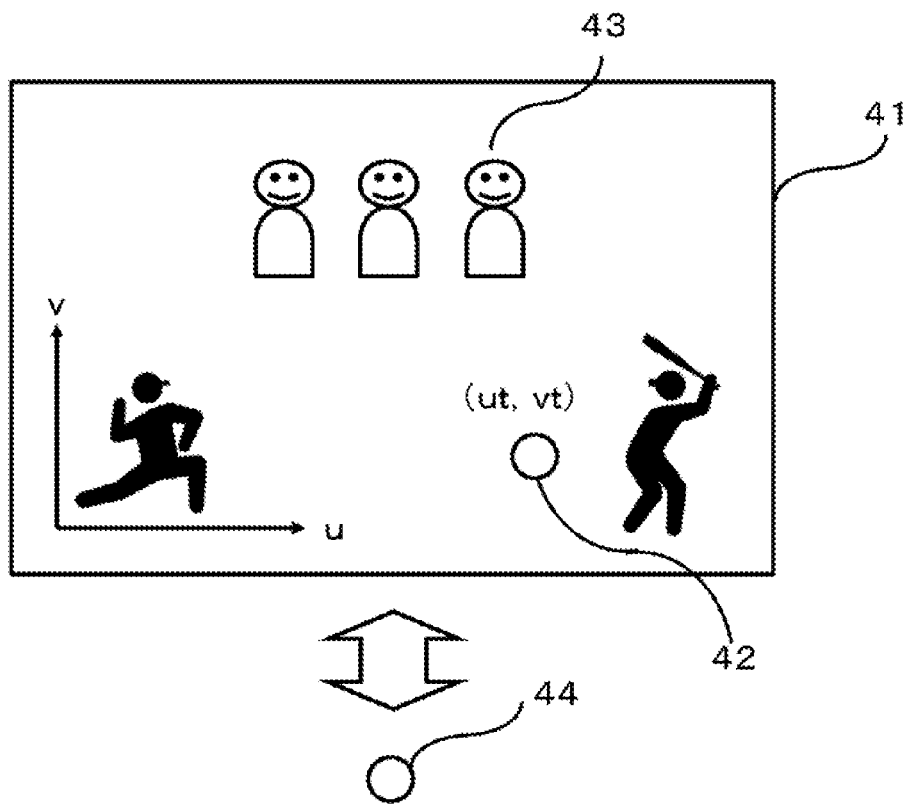
FIG. 4 shows a diagram showing schematically detection of a target moving body.

FIG. 4 shows a diagram schematically illustrating detection of the target moving body conducted by comparing the template image and candidate images of the target moving body included in the input image data in the image frames in the two-dimensional position calculation process (S301). The two-dimensional position calculation unit 101 extracts candidate images of the target moving body (such as an image of ball 42 and images of heads 43 of watchers) included in the image data in the image frame 41 as they are compared with the template image of ball 44 of baseball with respect to the shape, the color, and so on.

In the two-dimensional position calculation process (S301), the degree of match between the template image 44 and extracted candidate images of the target moving body is calculated respectively. The degree of match indicates the extent of matching quantitatively obtained from the correlation coefficient and the difference of pixels between the template image 44 and each of the extracted candidate images of the target moving body. The calculation method does not matter as long as the degree of match is obtained. For example, the SSD (Sum of Squared Difference) method of comparing summed values of square errors of respective pixel values thereof, the SAD (Sum of Absolute Difference) method of comparing summed values of absolute values of differences of the respective pixel values, the NCC (Normalized Cross-Correlation) method of comparing correlation coefficients of the respective pixel values, and so on are named.

In the two-dimensional position calculation process (S301), weighting by position is added to the degree of match calculated with respect to the extracted candidate images of the target moving body. In the present embodiment, the position of the target moving body (ball thrown by the pitcher) in the image frame is likely to be between the pitcher and a catcher with high probability and the position is likely to move from the pitcher toward the catcher as the time goes by with high probability such that the two-dimensional position calculation unit 101 calculates the degree of match with addition of the weighting by position calculated based on the existence probability of the target moving body. In an example of FIG. 4, the image of ball 42 comes to have higher degree of match with the addition of the weighting by position as the target moving body than the image of head 43 of each of the watchers. In the two-dimensional position calculation process (S301), the image of moving body judged to be the best match is detected as the target.

In the two-dimensional position calculation process (S301), a two-dimensional position is calculated in the image frame of the target moving body (image of ball 42 of baseball) detected by judging to be the best match to the template image 44. In the two-dimensional position calculation process (S301), the common two-dimensional coordinate system is set in every image frame with respect to the same camera. In FIG. 4, there is shown an example in which the two-dimensional position calculation unit 101 set the uv orthogonal coordinate system. In FIG. 4, in the two-dimensional position calculation process (S301), a two-dimensional position of (ut, vt) is calculated in the image frame at the time of t of the target moving body (image of ball 42) detected as being judged to be the best match to the template image 44.

In the two-dimensional position calculation process (S301), similar processes are conducted with respect to the image data in the image frames of the first camera and the second camera. Here, in the present embodiment, since the ball thrown by the pitcher in baseball is made to be the target, only data having positions in the u axis direction in the image frames of the target moving body (image of ball 42) located between the pitcher (U coordinates of the pitcher plate) and the catcher (U coordinates of the home base) will be utilized for the later processes. In the two-dimensional position calculation process (S301), if it is judged that the ball has reached the catcher (U coordinates of the home base) from the position in the u axis direction in the image frame of the target moving body (image of ball 42), the two-dimensional positions in the image frames of the target moving body detected for a period of time corresponding to one pitch are transferred together with information of the time when each of the image frames was taken to a existence plane calculation process (S302).

A existence plane calculation unit 101 executes the existence plane calculation process (S302) based on the two-dimensional positions in the image frames of the target moving body calculated from the image data in the image frames of the first camera after the two-dimensional position calculation unit 101 executes the two-dimensional position calculation process (S301). In the existence plane calculation process (S302), a plane constituted by connecting three-dimensional positions of the target moving body in consecutive image frames taken by the first camera and an optical center point of a lens of the first camera is calculated as an existence plane.

Figure 5:
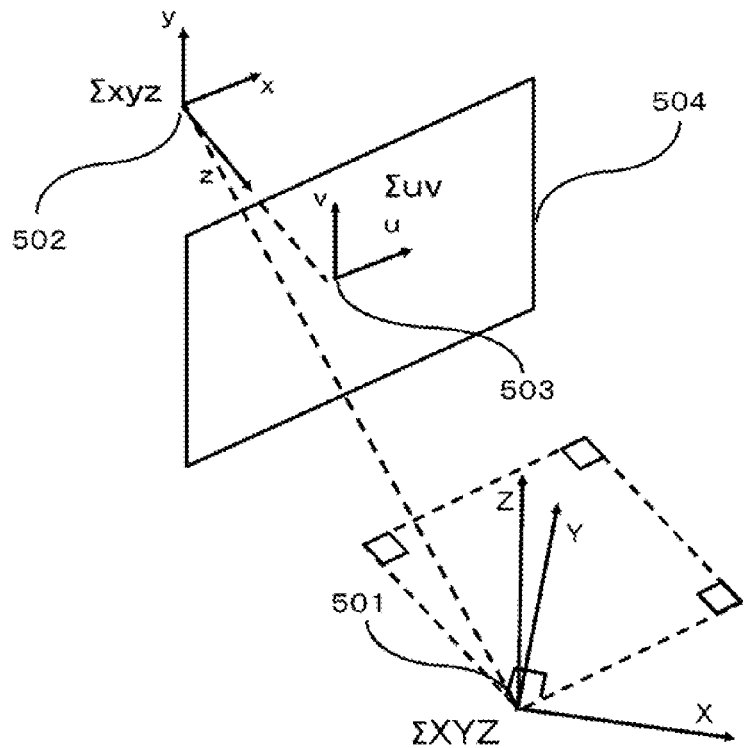
FIG. 5 shows a diagram illustrating a coordinate system used in explanation of an embodiment.

Here, the coordinate system used in the explanation of the present embodiment is explained. FIG. 5 shows a diagram illustrating the coordinate system used in the explanation of the present embodiment.

In the present embodiment, the following three-dimensional orthogonal coordinate system ZXYZ that is suitable for calculating the trajectory of the ball thrown by the pitcher in baseball is taken in the three-dimensional space. The home base is set as the origin 501 and the direction from the home base toward the center of the throwing position of the pitcher (the center of the pitcher's plate) is taken as a positive direction in the Y axis. The Z axis is taken in the height direction and the upward direction is taken as the positive direction. The direction that is perpendicular to the Y axis and the Z axis and toward the first base is taken as the positive direction in the X axis.

And in the present embodiment, the following points are set to have the following three-dimensional coordinates as a plurality of reference points having fixed coordinates in the three-dimensional coordinate system commonly existing in the image data of the plurality of cameras that are non-synchronized with each other and installed in different positions.

Home base: (X, Y, Z)=(0, 0, 0)
First base: (X, Y, Z)=(19.4, 19.4, 0)
Second base: (X, Y, Z)=(0, 38.8, 0)
Third base: (X, Y, Z)=(−19.4, 19.4, 0)

Instead the second base, the center of the pitcher's plate may be the reference point.

The center of the pitcher's plate: (X, Y, Z)=(0, 18.44, 0.254)

In the following explanation, an example in which the first base, the second base, and the third base are set to be the reference points is explained.

Here, this is an example and the setting of the three-dimensional coordinate system and the reference points is not limited to this. It is preferable to set the three-dimensional coordinate system and the reference points to what is suitable in accordance with the motion characteristics of the target moving body, a trajectory of which is calculated.

The coordinate system Σxyz is the three-dimensional orthogonal coordinate system having the origin 502 at the optical center of a lens of a camera. The coordinate system Σuv is the two-dimensional orthogonal coordinate system having the origin 503 fixed in the image frame (image pixel plane) 504. The coordinate system Σuv is a coordinate system in which the coordinate system Σxyz is translated and the xy coordinate axis and the uv coordinate axis are parallel. And the intersection point of the z axis of the coordinate system Σxyz and the image frame 504 becomes the origin 503 of the coordinate system Σuv. The z axis of the coordinate system Σxy is orthogonal to the image frame 504.

Next, the posture (orientation) of the camera, which is a combination of parameters representing the camera condition necessary for the trajectory calculation in the three-dimensional space of the target moving body, will be explained.

In the present embodiment, as the posture (orientation) of the camera, a rotation that is so-called an external parameter of the lens is used. In FIG. 5, the rotation is a rotation angle parameter of the three axes in conversion from the coordinate system Σxyz to the coordinate system ZXYZ. The optical axis of the lens is fixed by determining the value of the rotation. In FIG. 5, the z axis of the coordinate system Σxyz is the optical axis.

And, in Embodiment 1, it is assumed that so-called internal parameters (focal length and lens distortion) are known. In FIG. 5, the distance between the optical center point of the lens (origin 502 of the coordinate system Σxyz) of the camera and the origin 503 of the coordinate system Σuv is the focal length. Here, in case the lens distortion affects results, image data without any lens distortion may be produced and subsequent processes can be conducted with the image data from which the lens distortion has been removed. To remove the lens distortion, for example, a function for the distortion correction that is open to the public at OpenCV can be used.

Figure 6:
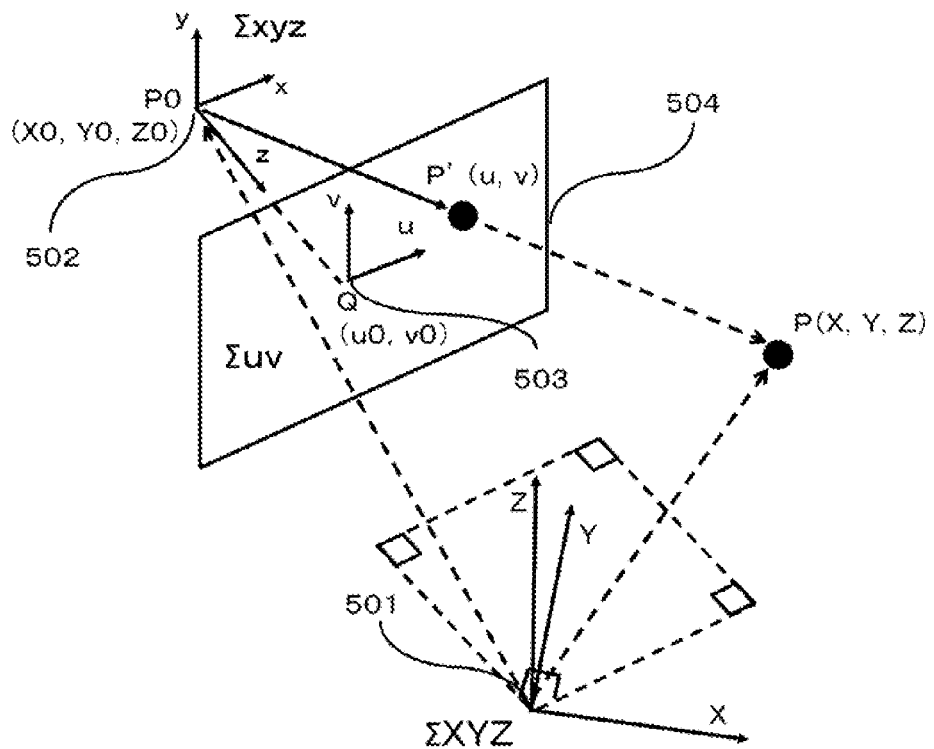
FIG. 6 shows a diagram showing a state in which a target P in the three-dimensional space is taken by a camera in FIG. 5.

Further, using FIG. 6, calculation of the three-dimensional line constituted by connecting the three-dimensional position of the target moving body in the image frame and the optical center point of the lens of the camera is explained.

FIG. 6 shows a diagram showing a state where the target P is taken by the camera in the three-dimensional space in FIG. 5. The three-dimensional position of the target P is set P(X, Y, Z) in the three-dimensional orthogonal coordinate system ZXYZ. The target P is taken by the camera having the optical center point of the lens at the origin 502 in the three-dimensional orthogonal coordinate system Σxyz as the image P' in the image frame 504. The two-dimensional position of the image P' is set P'(u, v) in the two-dimensional orthogonal coordinate system Σuv in the image frame.

In Embodiment 1, since the position coordinates and orientation (posture) of the camera are given beforehand in the three-dimensional orthogonal coordinate system, the position of the optical center point of the lens in the three-dimensional orthogonal coordinate system ZXYZ (origin 502 of the three-dimensional orthogonal coordinate system Σxyz) is set P0(X0, Y0, Z0). The z axis of the three-dimensional orthogonal coordinate system Σxyz having the optical center point of the lens at the origin 502 corresponds to the optical axis. The optical axis is orthogonal to the image frame 504 and the intersection point becomes the origin 503 in the two-dimensional coordinate system Σuv in the image frame. The two-dimensional position of the origin 503 is set Q(u0, v0). The distance between the origin 502 in the three-dimensional orthogonal coordinate system Σxyz and the origin 503 in the two-dimensional coordinate system Σuv is the focal length and the length thereof is represented by d.

In FIG. 6, the position of the image P', if viewed from the three-dimensional orthogonal coordinate system Σxyz having the optical center point of the lens at the origin 502, becomes P'(u−u0, v−v0, d). Here, let k be a constant of proportionality and let R be a coordinate transformation matrix from the three-dimensional orthogonal coordinate system Σxyz having the optical center point of the lens at the origin 502 to the three-dimensional orthogonal coordinate system ZXYZ in the three-dimensional space. Since the position coordinates and rotation (rotation angle parameters of the three axes in the coordinate transform from the coordinate system Σxyz to the coordinate system ZXYZ) of the camera in the three-dimensional orthogonal coordinate system ZXYZ in the three-dimensional space are given beforehand, the coordinate transformation matrix R can be determined.

Since the optical center point of the lens (origin 502) and the image P' and the target P are on the same straight line in the three-dimensional orthogonal coordinate system Σxyz having the optical center point of the lens at the origin 502, the following formula (formula 1) may be established.

$$P(X,Y,Z) = P0(X0,Y0,Z0) + kRP'(u-u0, v-v0, d).$$

Here, in the present embodiment, u−u0 and v−v0 as X coordinate and Y coordinate, respectively, of P' can be obtained from the coordinates of the two-dimensional position calculated by the two-dimensional position calculation unit 101 and d is the focal length, which is known.

In the previous formula, the straight line connecting the optical center point of the lens in the three-dimensional orthogonal coordinate system Σxyz and the image P' and the target P is expressed in the three-dimensional orthogonal coordinate system ΣXYZ. When the target P was taken by the camera having the optical center point of the lens at the origin 502 in the three-dimensional orthogonal coordinate system Σxyz, if the two-dimensional coordinates of the image P' in the two-dimensional orthogonal coordinate system Σuv in the image frame 504 can be determined, the previous formula can be calculated such that the target P should exist on the line represented by the previous formula in the three-dimensional orthogonal coordinate system ΣXYZ.

It refers back to the operation explanation of the existence plane calculation unit 102. The two-dimensional position in the image frame of the target moving body calculated from the image data in the image frames of the first camera and the second camera as the result of the execution of the two-dimensional position calculation process (S301) is transferred to the existence plane calculation unit 102 as the elements of the coordinate system Σuv from the two-dimensional position calculation unit 101.

Figure 7:
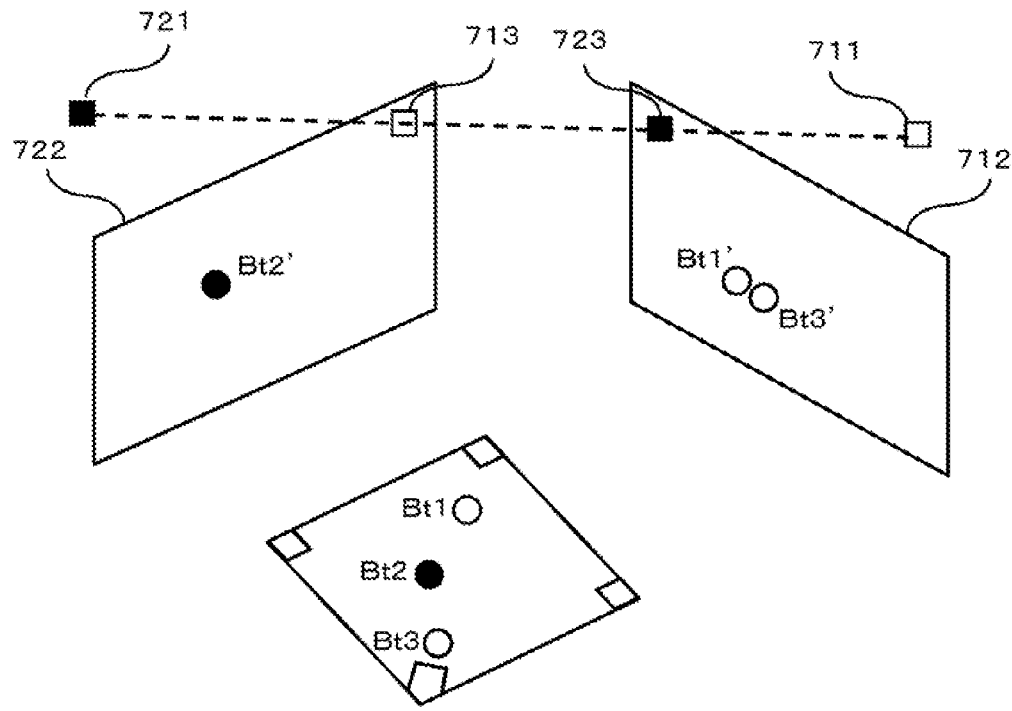
FIG. 7 shows a diagram schematically illustrating a state in which a ball thrown by a pitcher in a baseball is taken as a moving body by two cameras that are mutually non-synchronized.

FIG. 7 shows a diagram showing schematically a state where the ball thrown by the pitcher in baseball is taken as the target moving body by two cameras that are non-synchronized mutually. The first camera is denoted by 711, the image frame of the first camera is denoted by 712, the second camera is denoted by 721, and the image frame of the second camera is denoted by 722. And the image of the first camera on the image frame 722 of the second camera is denoted by 713 and the image of the second camera on the image frame 712 is denoted by 723. The three-dimensional positions of the ball thrown by the pitcher were denoted by Bt1, Bt2, and Bt3 at different times of t1, t2, and t3, respectively. The Bt1', Bt2', and Bt3' are the two-dimensional positions of the images of Bt1, Bt2, and Bt3 on the image frames transferred from the two-dimensional position calculation unit 101.

Since the first camera 711 and the second camera 721 are non-synchronized, the images were taken by the first camera 711 at the time of t1 and by the second camera 721 at the time of t3. Here, the Bt1' and Bt3' are on different image frames of the time t1 and the time t3, but in consideration of the easiness of the understanding, their two-dimensional positions are shown on the same image frame 712. And, here, it is assumed that the image frames at the time t1 and at the time t3 are consecutive with respect to the first camera.

Figure 8:
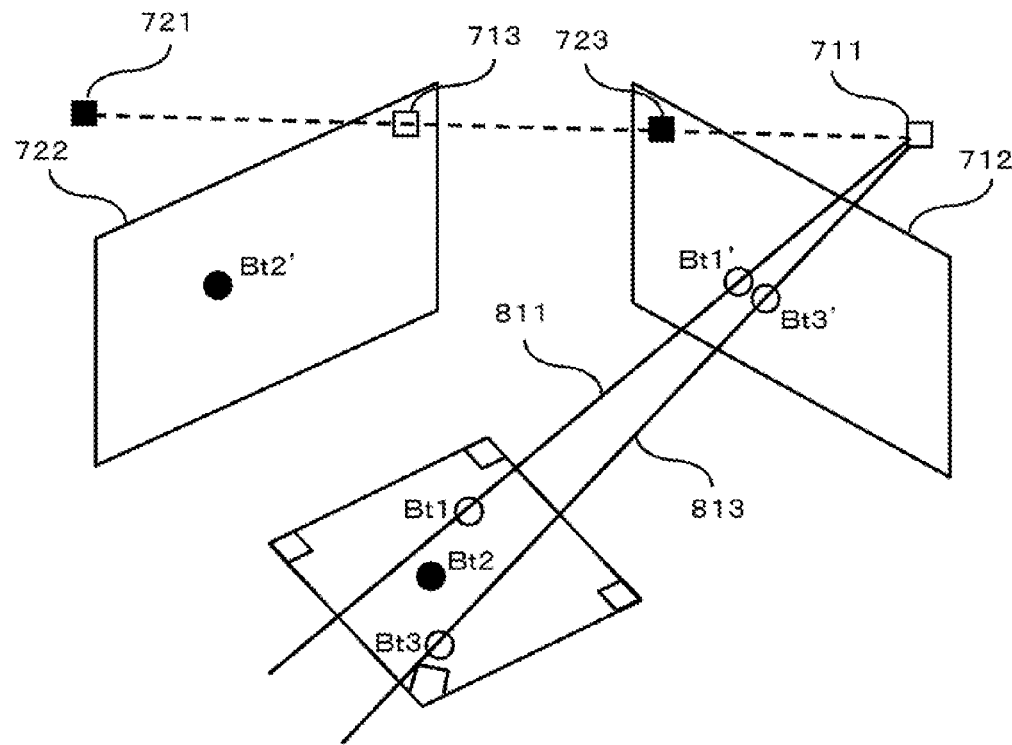
FIG. 8 shows a diagram illustrating an existence plane calculation process.

FIG. 8 shows a diagram illustrating the existence plane calculation process (S302) executed by the existence plane calculation unit 102. In the existence plane calculation process (S302), a plane constituted by connecting the three-dimensional positions of the target moving body taken by the first camera in the consecutive image frames and the optical center point of the lens of the first camera is calculated as the existence plane.

In the existence plane calculation process (S302), as explained with reference to FIG. 6, a straight line 811 in the three-dimensional space is calculated from the position coordinates and orientation of the first camera 11 in the three-dimensional space and Bt1' (two-dimensional position of the image Bt1 on the image frame 712) on the image frame 712 of the first camera 11. In the existence plane calculation process (S302), in a similar way, a straight line 813 in the three-dimensional space is calculated from Bt3' (two-dimensional position of the image Bt3 on the image frame 712). Since the straight line 811 and the straight line 831 cross at the optical center point of the lens of the first camera, a plane configured between the straight line 811 and the line 813 is calculated as an existence plane.

As explained with reference to FIG. 6, the three-dimensional position Bt1 of the ball thrown by the pitcher at the time t1 is on the straight line 811 in the three-dimensional space. And the three-dimensional position Bt3 of the ball thrown by the pitcher at the time t3 is on the straight line 813 in the three-dimensional space. Since the ball thrown by the pitcher makes a parabolic movement toward the catcher, if t1<t2<t3, the three dimensional position Bt2 of the ball thrown by the pitcher is likely to exist in the existence plane configured between the straight line 811 and the straight line 813 with high probability.

In the existence plane calculation process (S302), a plurality of adjacent existence planes are calculated from a combination of two-dimensional positions in the consecutive image frames of the target moving body calculated from the image data in the image frames of the first camera transferred from the two-dimensional position calculation process (S301). A plurality of existence planes are calculated which spread out in a fan-like form with the optical center point of the lens 711 of the first camera at the pivot point.

After the existence plane calculation process (S302) is completed by the existence plane calculation unit 102, the three-dimensional trajectory calculation unit 103 starts the three-dimensional trajectory calculation process (S303). The three-dimensional trajectory calculation process (S303) is a process in which the trajectory of the target moving body in the three-dimensional space is calculated from the intersection point at which the straight line connecting the three-dimensional positions of the target moving body in the image frames taken by the second camera and the optical center point of the lens of the second camera, from the two-dimensional positions of the target moving body calculated in the two-dimensional position calculation process (S301) taken by the second camera and the position coordinates and orientation of the second camera in the three-dimensional space.

Figure 9:
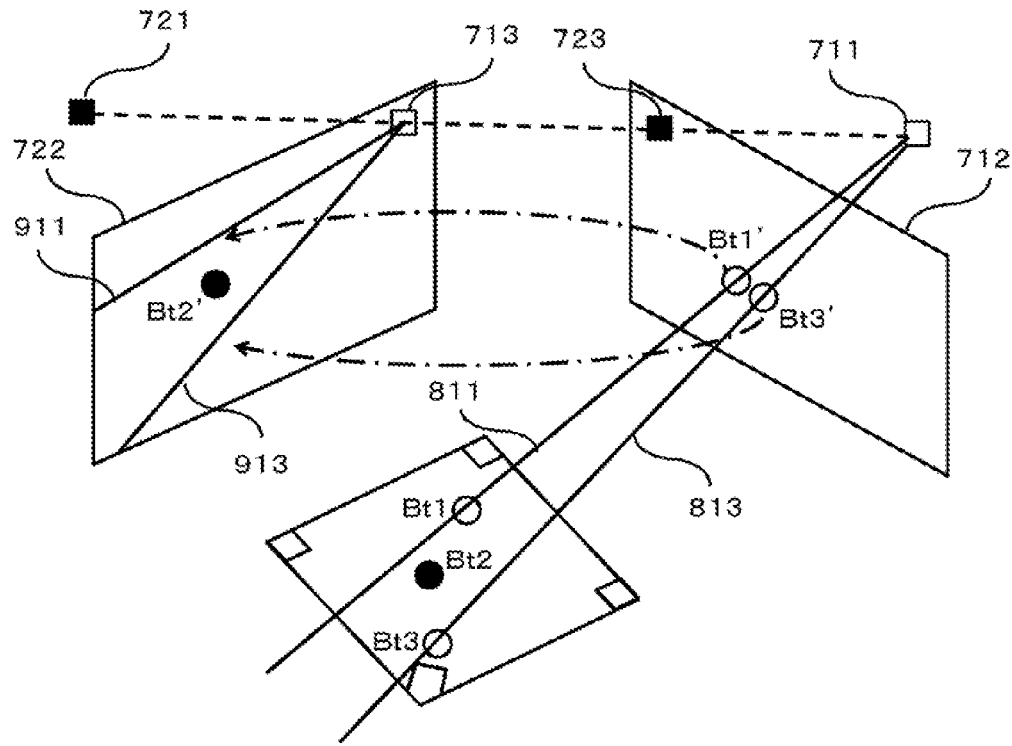
FIG. 9 shows a diagram illustrating correspondence an existence plane and a two-dimensional position of a target moving body in an image frame taken by a second camera.

In the three-dimensional trajectory calculation process (S303), correspondence between the existence planes and the two-dimensional positions of the target moving body in the image frames taken by the second camera. FIG. 9 shows a diagram illustrating the correspondence between the existence planes and the two-dimensional positions of the target moving body in the image frames taken by the second camera.

In FIG. 9, the straight line 911 and the straight line 913 in the image frame 722 taken by the second camera 721 are projections of the straight line 811 and the straight line 813 in the three-dimensional space calculated in the existence plane calculation process (S302), respectively. In FIG. 9, Bt2' (two-dimensional position of the image of Bt2 on the image frame taken by the second camera) in the image frame 722 taken by the second camera 721 is located between the straight line 911 and the straight line 913 as the positional correlation. In the three-dimensional trajectory calculation process (S303), a combination of the existence plane and the two-dimensional position of the target moving body in the image frame 722 taken by the second camera 21 having such a relationship is extracted.

Here, since the position coordinates and orientation of the camera in the three-dimensional space are given beforehand in Embodiment 1, the mapping transformation from the straight line 911 and the straight line 913 in the three-dimensional space to the straight line 811 and the straight line 813 in the image frame 722 can be realized by conducting the conversion from the three-dimensional orthogonal coordinate system ΣXYZ in the three-dimensional space to the two-dimensional orthogonal coordinate system Σuv through the three-dimensional orthogonal coordinate system Σxyz having the optical center point of the lens at the origin.

In the three-dimensional trajectory calculation process (S303), the three dimensional coordinates of the intersection point at which the straight line connecting the three-dimensional position of the target moving body in the image frames taken by the second camera and the optical center point of the lens of the second camera intersects the corresponding existence plane are calculated, from the two-dimensional position of the target moving body in the image frame taken by the second camera and the position coordinates and orientation in the three-dimensional space of the second camera.

Figure 10:
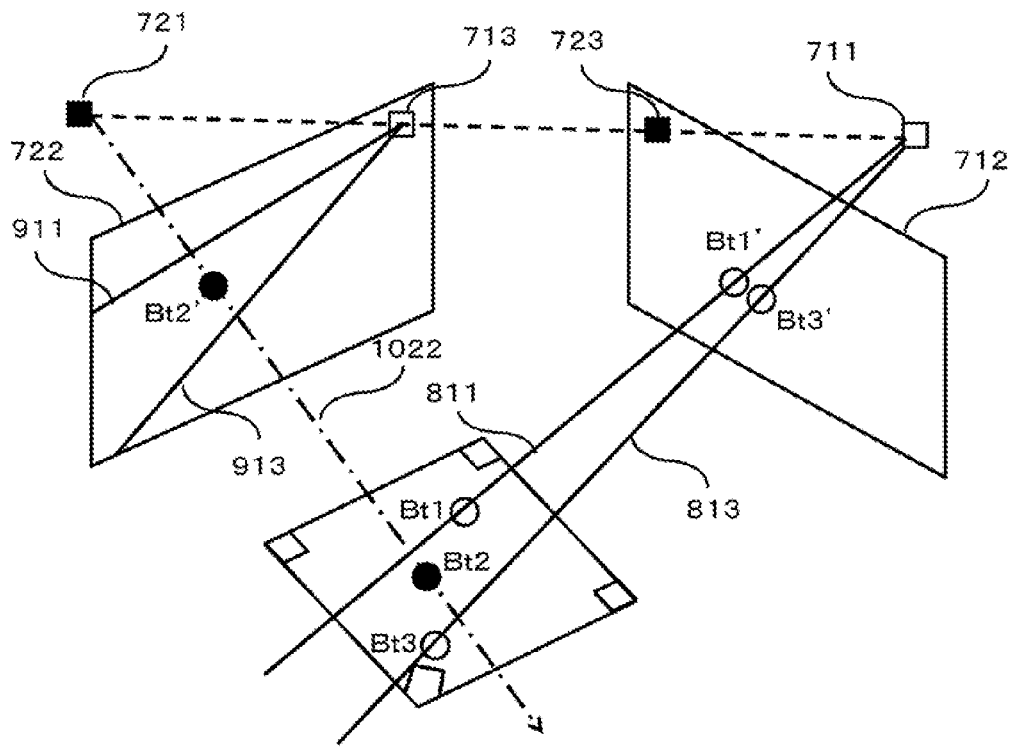
FIG. 10 shows a diagram illustrating calculation of three-dimensional coordinates of an intersection point at which a line connecting a three-dimensional position of the target moving body in the image frame taken by the second camera and an optical center point of a lens of the second camera intersects an existence plane.

FIG. 10 shows a diagram illustrating the calculation of the three-dimensional coordinates of the intersection point at which the line connecting the three dimensional position of the target moving body in the image frame taken by the second camera and the optical center point of the lens of the second camera intersects the corresponding existence plane.

In FIG. 10, the straight line 1022 is a straight line connecting the three-dimensional position of the target moving body in the image frame 722 taken by the second camera and the optical center point 721 of the lens of the second camera. The straight line 1022 is calculated in a similar way where the calculation of the straight line 811 and the straight line 813 is explained with reference to FIG. 8. The existence plane between the straight line 811 and the straight line 813 and the straight line 1022 are calculated in the same three-dimensional coordinate system (three-dimensional orthogonal coordinate system ΣXYZ in the three-dimensional space in FIG. 6), and, in the three-dimensional trajectory calculation process (S303), the three-dimensional coordinates of the intersection point are calculated.

The three-dimensional position Bt2 of the ball thrown by the pitcher as the target exists on the straight line 1022. On the other hand, as mentioned before, the three-dimensional position Bt2 of the ball thrown by the pitcher as the target is to exist in the existence plane between the straight line 811 and the straight line 813 with high probability. From this, the three-dimensional coordinates of the intersection point at which the straight line 1022 intersects the existence plane between the straight line 811 and the straight line 813 becomes very close to the three-dimensional position Bt2 of the ball thrown by the pitcher as the target.

In the three-dimensional trajectory calculation process (S303), the three-dimensional coordinates of the intersection point at which the line connecting the three dimensional position of the target moving body in the image frame taken by the second camera and the optical center point of the lens of the second camera intersects the corresponding existence plane are calculated with respect to the all two-dimensional positions in the image frame of the second camera of the target moving body calculated in the two-dimensional position calculation process (S301).

The three-dimensional trajectory calculation unit 103 outputs, as the trajectory of the target moving body, the coordinates of the calculated target moving body in the three-dimensional space at a plurality of times and the three-dimensional trajectory calculation process (S303) is terminated. Or information of a three-dimensional curve that approximates the coordinates of the target moving body in the three-dimensional space at a plurality of times may be output as the trajectory of the target moving body and the three-dimensional trajectory calculation process (S303) may be terminated. In the case where the ball thrown by the pitcher in baseball of the present embodiment is set to be the target moving body, it is known that a highly accurate result can be obtained through the curve approximation by a polynomial. Here, the output information may be information that can specify the trajectory of the target moving body in the three-dimensional space, it is not limited to that of the present embodiment.

The above is the explanation of Embodiment 1.

Embodiment 2

In Embodiment 2, the operation of the trajectory calculation device 1 is explained in the case where the position coordinates and orientation of the camera in the three-dimensional space in the three-dimensional coordinate system are not given beforehand. And there is explained the operation of the trajectory calculation device 1 to select the first camera and the second camera from a plurality of cameras that are non-synchronized with each other and installed in different positions.

Figure 11:
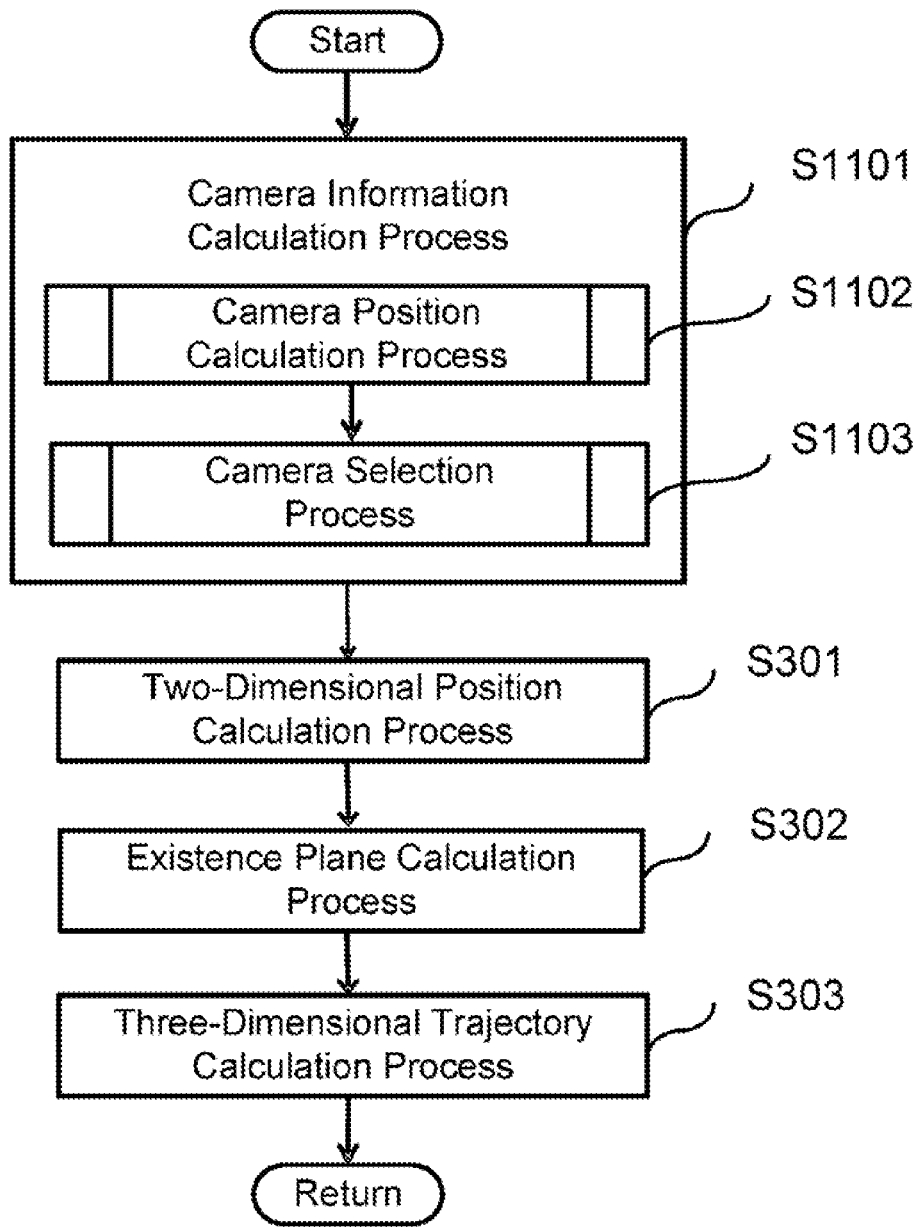
FIG. 11 shows a flow chart showing operations of a trajectory calculation device according to Embodiment 2.

FIG. 11 shows a flow chart illustrating the operation of the trajectory calculation device 1 of Embodiment 2. According to the flow chart of FIG. 11, the operation of the trajectory calculation device 1 is explained.

In Embodiment 2, the camera information calculation unit 104 operates, which is different from that in Embodiment 1. In Embodiment 2, after the image data in the image frame of the camera is input to the trajectory calculation device 1 from the outside, the trajectory calculation device 1 starts the operation and the camera information calculation unit 104 executes the camera information calculation process (S1101). The camera information calculation process (S1101) includes a camera position calculation process (S1102) and a camera selection process (S1103).

Here, since the operation of the trajectory calculation device 1 is similar to that of Embodiment 1 after the camera information calculation unit 104 executes the camera information calculation process (S1101), the camera information calculation process (S1101) is explained in Embodiment 2.

First, the camera position calculation process (S1102) is explained among the camera information calculation process (S1101). Since the position coordinates and orientation of the camera in the three-dimensional space in the three-dimensional coordinate system are not given beforehand, in the camera position calculation process (S1102), the position coordinates and orientation of the camera in the three-dimensional space in the three-dimensional coordinate system are calculated from a plurality of reference points having fixed coordinates in the three-dimensional space existing in the image data in the image frame. Here, it is assumed that the focal length d is known.

As mentioned before, in the present embodiment, the following points are set to have the following three-dimensional coordinates as a plurality of reference points having fixed coordinates in the three-dimensional coordinate system commonly existing in the image data of the plurality of cameras that are non-synchronized with each other and installed in different positions.

Home base: (X, Y, Z)=(0, 0, 0)
First base: (X, Y, Z)=(19.4, 19.4, 0)
Second base: (X, Y, Z)=(0, 38.8, 0)
Third base: (X, Y, Z)=(−19.4, 19.4, 0)

The following formula (formula 1) was obtained since the optical center point of the lens (origin 502) and the image P' and the target P are on the same straight line in the three-dimensional orthogonal coordinate system Σxyz having the optical center point of the lens at the origin 502.

$$P(X,Y,Z)=P0(X0,Y0,Z0)+kRP'(u-u0,v-v0,d).$$

In the camera position calculation process (S1102), with respect to the above formula 1, as d is known and P(X, Y, Z) is set to be each reference point, the position coordinates and orientation of the camera in the three-dimensional orthogonal coordinate system ZXYZ in the three-dimensional space are calculated. Concretely, the optical center point of the lens P0(X0, Y0, Z0) of the camera in the three-dimensional orthogonal coordinate system ZXYZ and the rotation (rotation angle parameters of three axes when the coordinate transformation from the coordinate system Σxyz to the coordinate system XYZ is conducted) constituting the coordinate transformation matrix R are calculated by the above formula 1.

Here, with respect to calculation of rotation (rotation angle parameters of the three axes in the coordinate transform from the coordinate system Σxyz to the coordinate system ZXYZ) constituting the coordinate transformation matrix R and the optical center point of the lens P0(X0, Y0, Z0) of the camera in the three-dimensional orthogonal coordinate system ZXYZ, the number of unknown elements is six and the image of the target moving body in the image frame is given by elements of the two-dimensional orthogonal coordinate system Σuv such that the number of the reference points sufficiently three (3). However, in consideration of improvement in the calculation accuracy by increasing the number of reference points, in the present embodiment, the number of reference points is set to be four (4). It is preferable that the number of the reference points should be suitable to the space to be measured and the arrangement of the available reference points and the number of the reference points is not limited to four (4).

With respect to the present embodiment, in the camera position calculation process (S1102), the position coordinates and orientation of the camera in the three-dimensional coordinate system in the three-dimensional space are subject to the calculation process by the non-linear least-squares method. Here, this is just an example and the method of processing is not limited thereto, but another method of processing may be employed as long as the position coordinates and orientation of the camera in the three-dimensional coordinate system in the three-dimensional space can be calculated with high accuracy. For example, there may be calculation by the LM method (Levenberg-Marquardt Method) in which high accuracy can be expected and the DLT method (Direct Linear Transformation method) in which the number of the reference points is increased.

Next, the camera selection process (S1103) among the camera information calculation process (S1101) is explained. In the camera selection process (S1103), in the case where the first camera and the second camera are not selected from a plurality of cameras that are non-synchronized mutually and installed in different positions, the first camera and the second camera are selected based on the optical axis of the camera and the moving direction of the target moving body. In the present embodiment, since the ball thrown by the pitcher in baseball is set to be the target moving body, the moving direction of the target moving body may be considered the direction from the pitcher toward the catcher, it matches the Y axis in the three-dimensional orthogonal coordinate system ΣXYZ in the three-dimensional space as shown in FIG. 5.

The optical axis of the camera matches the z axis in the three-dimensional orthogonal coordinate system Σxyz having the optical center point of the lens at the origin 502 as shown in FIG. 5. The optical axis of the camera can be obtained from the position coordinates and orientation in the three-dimensional coordinate system in the three-dimensional space of the camera calculated in the camera position calculation process (S1102).

In the camera selection process (S1103), two cameras having the optical axes that are closest to vertical are selected from the plurality of cameras installed in different positions as the first camera and the second camera. As shown in FIG. 10, it is considered that the straight line 1022 connecting the three-dimensional position of the target moving body in the image frame 722 taken by the second camera and the optical center point 721 of the lens of the second camera tends to intersect almost orthogonally the existence plane configured between the straight line 1022 and the straight line 811 as the optical axes of the first camera and the second camera are closer to vertical such that it is considered that the intersection point of the straight line 1022 and the existence plane configured between the straight line 811 and the straight line 813 can be obtained with high accuracy.

In the camera selection process (S1103), the camera having the optical axis closest to vertical to the moving direction of the target moving body is selected as the second camera. This is because, in a similar way, it is considered that the intersection point of the straight line 1022 and the existence plane configured between the straight line 811 and the straight line 813 can be obtained with high accuracy.

The above is the explanation of Embodiment 2.

Next, a trajectory calculating program to make a computer work as the trajectory calculation device 1 is explained. The configuration of the computer is as shown in FIG. 2.

The trajectory calculating program includes a main module, an input-output module, and a processor module. The main module is a part to control integrally the image processing. The input-output module obtains input information such as image data in the image frame and makes the computer work to output coordinates in the target image frame to specify the moving body detected as the target. The processor module includes a two-dimensional position calculation module, an existence plane calculation module, a three-dimensional trajectory calculation module, and a camera information calculation module. The functions realized by running the main module, the input-output module, and the processor module are the same as those of the two-dimensional position calculation unit 101, the existence plane calculation unit 102, the three-dimensional trajectory calculation unit 103, and the camera information calculation unit 104, respectively.

The moving body detecting program is provided, for example, by a storage medium such as ROM or a semiconductor memory. And the moving body detecting program may be provide via the network. As mentioned above, the trajectory calculation device, the trajectory calculating method, and the trajectory calculating program in the present embodiment can make it possible to calculate the trajectory of the target moving body in the three-dimensional space using image data taken by a plurality of cameras that are non-synchronized with each other, thereby solving the issue that the high performance equipment and system such as a system to make the synchronization among the plurality of cameras and a camera having a built-in function to make the synchronization are required. And the positions of cameras in the three-dimensional space are calculated from a plurality of reference points having fixed position coordinates in the three-dimensional space that are present commonly in the image data of the respective cameras are calculated, thereby solving the issue that it is desired to increase the freedom of camera arrangement while keeping low the costs for position measurement and installation work of the cameras.

EXPLANATION OF NUMERALS

1 trajectory calculation device
101 two-dimensional position calculation unit
102 existence plane calculation unit
103 three-dimensional trajectory calculation unit
104 camera information calculation unit
2 device including moving body tracking device
201 central processing unit (CPU)
202 input device
203 output device
204 main memory (RAM/ROM)
205 auxiliary memory
41 image frame
42 image of ball
43 image of head of watcher
44 template image
501 origin of three-dimensional orthogonal coordinate system $\Sigma XYZ$
502 origin (optical center point of lens of camera) of three-dimensional orthogonal coordinate system $\Sigma xyz$
503 origin of two-dimensional orthogonal coordinate system $\Sigma uv$
504 image frame
711 optical center point of lens of first camera
712 image frame of first camera
713 image of first camera on image frame of second camera
721 optical center point of lens of second camera
722 image frame of second camera
723 image of second camera on image frame of first camera
811 straight line connecting three-dimensional position of target moving body (Bt1) taken in the image frame by first camera and optical center point of lens of first camera
813 straight line connecting three-dimensional position of target moving body (Bt2) taken in the image frame by first camera and optical center point of lens of first camera
911 projection to image frame of second camera of straight line 811 in three-dimensional space
913 projection to image frame of second camera of straight line 813 in three-dimensional space
1022 straight line connecting three-dimensional position of target moving body (Bt2) taken in image frame by second camera and optical center point of lens of second camera

What is claimed is:

1. A trajectory calculation device for calculating a trajectory of a target moving body from image data taken by a first camera and a second camera being mutually non-synchronized and installed in different positions, comprising:
    a central processing unit,
    an input device,
    an output device, and
    a memory,
    wherein the central processing unit is operable to:
    detect the target moving body from image data in a first image frame and a second image frame taken by the first camera and calculate two-dimensional positions of the target moving body in the first and the second image frames, which are consecutive over time, and in a third image frame taken by the second camera and calculate a two-dimensional position of the target moving body in the third image frame;
    calculate a three-dimensional plane constituted by connecting three-dimensional positions of the target moving body in the first and the second image frames and an optical center point of a lens of the first camera as an existence plane from the two-dimensional positions of the target moving body and position coordinates and orientation of the first camera in a three-dimensional space; and
    calculate the trajectory of the target moving body in the three-dimensional space from an intersection point of the existence plane and a straight line connecting an optical center point of a lens of the second camera and a three-dimensional position of the target moving body calculated from a two-dimensional position thereof in the third image frame and position coordinates and orientation of the second camera in the three-dimensional space, wherein the straight line intersects the existence plane at the intersection point.

2. The trajectory calculation device according to claim 1, wherein the central processing unit is operable to calculate the position coordinates and orientation of the first and the second cameras from a plurality of reference points having fixed coordinates in the three-dimensional space and existing in the image data of the image frame.

3. The trajectory calculation device according to claim 2, wherein optical axes of the first camera and the second camera are arranged substantially perpendicular to each other.

4. The trajectory calculation device according to claim 2, wherein an optical axis of the second camera is arranged substantially perpendicular to a moving direction of the target moving body.

5. The trajectory calculation device according to claim 3, wherein an optical axis of the second camera is arranged substantially perpendicular to a moving direction of the target moving body.

6. A trajectory calculation method for calculating a trajectory of a target moving body from image data taken by a first camera and a second camera being mutually non-synchronized and installed in different positions, the method comprising:
    a two-dimensional position calculation step of detecting the target moving body from image data in a first image frame and a second image frame taken by the first camera and calculating two-dimensional positions of the target moving body in the first and the second image frames, which are consecutive over time, and in a third image frame taken by the second camera, calculating a two-dimensional position of the target moving body in the third image frame;
    an existence plane calculation step of calculating a three-dimensional plane constituted by connecting three-dimensional positions of the target moving body in the first and the second image frames and an optical center point of a lens of the first camera as an existence plane from the two-dimensional positions of the target moving body and position coordinates and orientation of the first camera in a three-dimensional space; and
    a three-dimensional trajectory calculation step of calculating the trajectory of the target moving body in the three-dimensional space from an intersection point of the existence plane and a straight line connecting an optical center point of a lens of the second camera and a three-dimensional position of the target moving body calculated from a two-dimensional position thereof in the third image frame and position coordinates and orientation of the second camera in the three-dimensional space, wherein the straight line intersects the existence plane at the intersection point.

7. The trajectory calculation method according to claim 6, comprising: a camera information calculation step of calculating position coordinates and orientation of the first and the second cameras from a plurality of reference points having fixed coordinates in the three-dimensional space and existing in the image data of the image frame.

8. The trajectory calculation method according to claim 7, wherein an optical axis of the second camera is arranged substantially perpendicular to a moving direction of the target moving body.

9. A trajectory calculation device capable of calculating a trajectory of a target moving body in a three-dimensional space using first video data and second video data obtained during a same time period by first and second non-synchronized cameras installed in different positions, comprising:
    a central processing unit,
    an input device,
    an output device, and
    a memory,
    wherein the central processing unit is operable to:
    detect the target moving body from image data in a first image frame and a second image frame constituting the first video data taken by the first camera and calculate two-dimensional positions of the target moving body in the first and the second image frames, which are consecutive over time, and detect the target moving body from image data in a third image from constituting the second video data taken by the second camera and calculate a two-dimensional position of the target moving body in the third image frame;
    calculate a plane as an existence plane configured by a first straight line connecting an optical center point of a lens of the first camera and a first two-dimensional position of the target moving body in the first image frame and a second straight line connecting the optical center point of the lens of the first camera and a second two-dimensional position of the target moving body in the second image frame in the three-dimensional space from position coordinates of the first and the second two-dimensional positions and orientation and position coordinates of the optical center point of the lens of the first camera;
    calculate three-dimensional position coordinates of an intersection at which a straight line connecting an optical center point of a lens of the second camera and the two-dimensional position of the target moving body in the third image frame intersects the existence plane, the third image frame having been taken at a time between the first and the second image frames, from three-dimensional position coordinates obtained from the two-dimensional position of the target moving body in the third image frame and orientation and position coordinates of the optical center point of the lens of the second camera, and calculate the trajectory of the target moving body in the three-dimensional space.

10. The trajectory calculation device according to claim 9, wherein optical axes of the first and the second cameras are substantially perpendicular.

11. The trajectory calculation device according to claim 9, wherein the central processing unit is operable to calculate the orientation and the position coordinates of the optical center points of the lenses of the first and second cameras from a plurality of reference points having predetermined position coordinates in the three-dimensional space and existing in the respective image data of the respective image frames.

* * * * *